(12) United States Patent
Boyd

(10) Patent No.: US 7,793,994 B2
(45) Date of Patent: Sep. 14, 2010

(54) THREADED TUBULAR CONNECTION

(76) Inventor: Anthony R. Boyd, 1907 Vida Shaw Rd., New Iberia, LA (US) 70563

(*) Notice: Subject to any disclaimer, the term of this patent is extended or adjusted under 35 U.S.C. 154(b) by 0 days.

(21) Appl. No.: 12/231,041

(22) Filed: Aug. 28, 2008

(65) Prior Publication Data
US 2009/0033092 A1 Feb. 5, 2009

Related U.S. Application Data

(60) Division of application No. 11/229,919, filed on Sep. 19, 2005, now Pat. No. 7,434,848, which is a continuation-in-part of application No. 11/127,919, filed on May 12, 2005, now abandoned.

(51) Int. Cl.
*F16L 19/00* (2006.01)
*F16L 33/18* (2006.01)

(52) U.S. Cl. ............... 285/354; 285/330; 285/333; 285/371; 285/386; 285/390; 285/913

(58) Field of Classification Search ......... 285/369–373, 285/390–393, 397, 398, 417–419, 913, 330, 285/245, 246, 247, 353, 354, 384, 386, 387, 285/388, 389; 403/299, 342
See application file for complete search history.

(56) References Cited

U.S. PATENT DOCUMENTS

| 600,988 | A | | 3/1898 | Hayes | |
|---|---|---|---|---|---|
| 1,041,260 | A | * | 10/1912 | Erickson | .................. 285/330 |
| 1,054,812 | A | | 3/1913 | Zierath | |
| 1,438,751 | A | | 12/1922 | Des Isles | |
| 1,497,952 | A | | 6/1924 | Smith | |
| 1,547,759 | A | | 7/1925 | Journeay | |
| 1,570,155 | A | * | 1/1926 | Karbowski | .................. 285/328 |
| 1,589,781 | A | | 6/1926 | Anderson | |
| 1,913,030 | A | * | 6/1933 | Hux | .................. 277/336 |
| 2,296,198 | A | * | 9/1942 | Boynton | .................. 285/91 |
| 2,464,744 | A | * | 3/1949 | Fennema | .................. 285/330 |
| 2,574,081 | A | | 11/1951 | Abegg | |
| 2,757,966 | A | * | 8/1956 | Samiran | .................. 239/266 |
| 3,198,555 | A | | 8/1965 | Johnson et al. | |
| 3,381,980 | A | | 5/1968 | Smith | |
| 4,099,745 | A | | 7/1978 | Cobbs | |
| 4,508,182 | A | | 4/1985 | Anders | |
| 4,634,154 | A | * | 1/1987 | Arora et al. | .................. 285/353 |
| 4,655,479 | A | | 4/1987 | Farr, Jr. | |
| 4,737,284 | A | * | 4/1988 | Hauke et al. | .................. 210/198.2 |
| 4,754,995 | A | * | 7/1988 | Takahashi et al. | .................. 285/353 |
| 4,806,238 | A | * | 2/1989 | Sattler et al. | .................. 210/198.2 |

(Continued)

*Primary Examiner*—James M Hewitt
*Assistant Examiner*—Jay R Ripley
(74) *Attorney, Agent, or Firm*—Law Office of Jesse D. Lambert, L.L.C.

(57) ABSTRACT

A tubular connection including a first joint having outer threads and an inner bore, and a second joint having outer threads and an inner bore. The tubular connection further includes an outer nut having inner threads that cooperate with the outer threads of the first joint and the second joint. The tubular connection further includes an inner sleeve positioned within the first inner bore and the second inner bore. In one embodiment, the first inner bore contains a first groove having a first seal disposed therein and the second inner bore contains a second groove having a second seal disposed therein, wherein the first and second seals prevents a pressure from exiting the first and second inner bore.

7 Claims, 16 Drawing Sheets

U.S. PATENT DOCUMENTS

| | | | |
|---|---|---|---|
| 4,921,284 A * | 5/1990 | Singeetham | 285/415 |
| 5,404,856 A | 4/1995 | Servati | |
| 5,655,794 A | 8/1997 | Sell | |
| 5,950,744 A | 9/1999 | Hughes | |
| 5,997,045 A | 12/1999 | Boe et al. | |
| 6,244,345 B1 | 6/2001 | Helms | |
| 6,520,547 B2 | 2/2003 | Robinson | |
| 6,553,825 B1 | 4/2003 | Boyd | |
| 6,666,274 B2 * | 12/2003 | Hughes | 166/385 |
| 7,192,187 B2 * | 3/2007 | Blichmann | 374/147 |
| 7,213,655 B2 * | 5/2007 | Parrott | 166/380 |
| 2003/0127857 A1 | 7/2003 | Boyd et al. | |
| 2004/0207202 A1 | 10/2004 | Parks | |
| 2005/0022999 A1 | 2/2005 | Hughes | |
| 2007/0007760 A1 | 1/2007 | Stolle et al. | |
| 2007/0252387 A1 | 11/2007 | Beard et al. | |

* cited by examiner

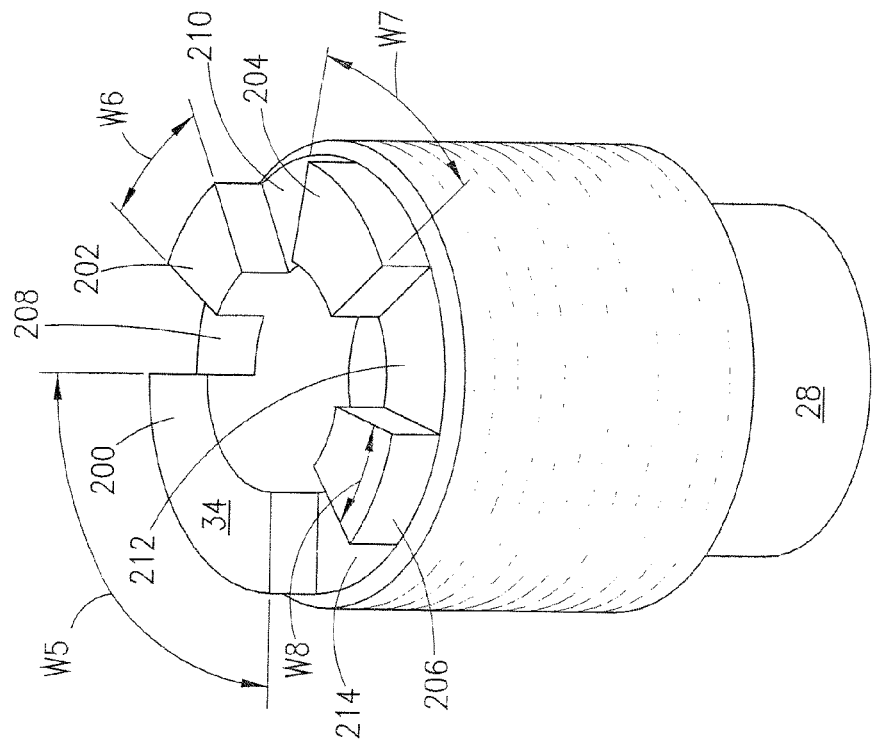
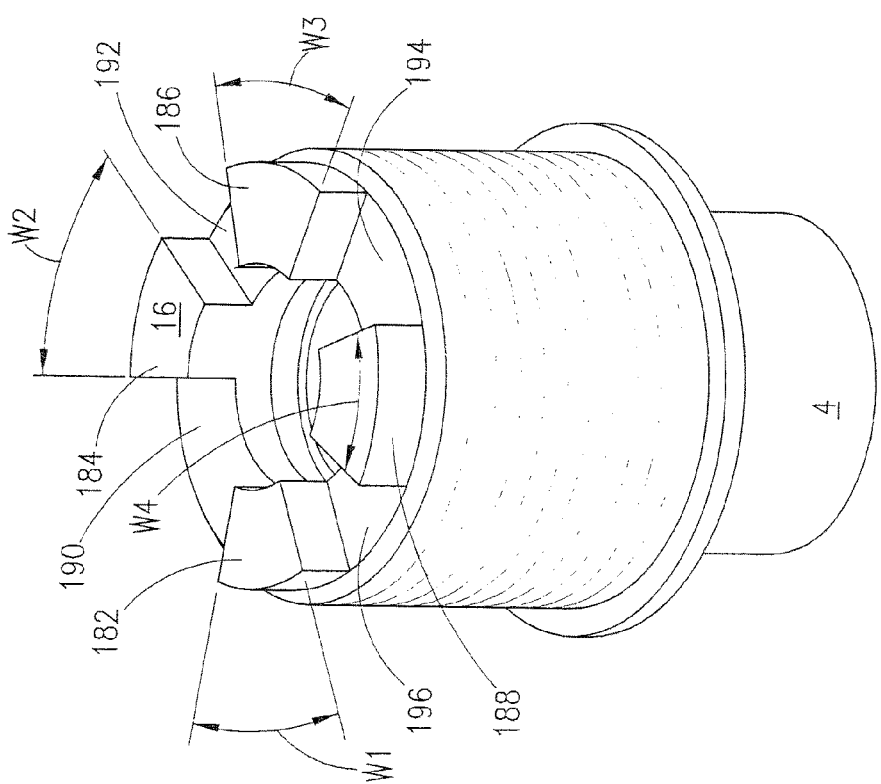

THREADED TUBULAR CONNECTION

CROSS-REFERENCE TO RELATED APPLICATIONS

This application is a divisional of and claims priority to U.S. patent application Ser. No. 11/229,919, filed on Sep. 19, 2005 now U.S. Pat. No. 7,434,848, which is a continuation-in-part of U.S. patent application Ser. No. 11/127,919, filed 12 May 2005 now abandoned.

BACKGROUND OF THE INVENTION

This invention relates to a tubular connection. More specifically, but not by way of limitation, this invention relates to an apparatus and method for providing a connection between a first tubular and a second tubular.

A connection between a first tubular and a second tubular affords several advantages. For instance, a tubular connection provides a means for pressure sealing the internal portion of the tubulars. Also, the tubular connection provides a means for allowing the transfer of a pulling force. A tubular connection must also provide for the transferring of torque. In the oil and gas industry, the pressure, pull and torque issues are critical in designing a tubing string for production, drilling and completion operations.

Prior art connections have been designed that have specialty purposes. For example, FMC Corporation has developed a tubular connection that is for flow lines and the connection is commercially available from FMC Corporation under the name Chikson. Also, various manufactures have developed specialty threads that possess the ability to withstand high pressure, or transfer high torque.

However, as those in the oil and gas industry recognize, pressure, torque, tensile strength, and compressive forces are all very important as the industry continues to expand its search for hydrocarbons into extreme and remote regions including deep water frontiers. Therefore, this invention solves many of the problems associated with the prior art connections. An object of the present invention is to provide a tubular connection that allows for the transfer of torque without harm to the threads. Another object of the invention is to allow for high tensile strength during operations that entail lifting. Yet another object of the invention is the internal sealing ability. Still another object is the safety and ease of use of the tubular connection. These and many other objects will be met by the invention herein disclosed.

SUMMARY OF THE INVENTION

A tubular connection is disclosed. The tubular connection comprises a first joint having outer threads, and a plurality of wedges at a bottom end of the first joint. The tubular connection further includes a second joint having outer threads, and a reciprocal plurality of wedges at a top end of the second joint. The plurality of wedges and the reciprocal plurality of wedges cooperate to engage. The tubular connection may also include a pin connector disposed through the shell and engaging the first joint which prevents the shell from unscrewing.

The tubular connection further includes a shell having an inner thread that cooperates with the outer threads of the first joint and the second joint. In this embodiment, the first joint has a first inner bore and the second joint has a second inner bore, and wherein the tubular connection further comprises an inner sleeve positioned within the first inner bore and the second inner bore. In one embodiment, the first inner bore contains a first groove having first seal means disposed therein and the second inner bore contains a second groove having second seal means disposed therein, wherein the first seal means and the second seal means prevents a pressure from exiting the first inner bore and the second inner bore. Also, the inner sleeve may contain an external thread that engages with an internal thread within the first inner bore. In one preferred embodiment, the outer threads of the first joint and the second joint are an acme thread. In one preferred embodiment, the first joint and the second joint form part of work string on a drilling rig.

In a second preferred embodiment, which is the most preferred embodiment of this application, a tubular connection is disclosed that includes a first joint having outer threads, and wedges at a bottom end of the first joint. The tubular connection further includes a second joint having reciprocal wedges at a top end of the second joint, wherein the wedges cooperate to engage. The tubular connection further comprises a sub having outer threads, with the sub being disposed about the second joint, and a shell having inner threads that cooperate with the outer threads of the first joint and the second joint. The tubular connection further comprises a shell having inner threads that cooperate with the outer threads of the first and second joints.

In this second embodiment, the first joint has a first inner bore and the second joint has a second inner bore, and wherein the tubular connection further comprises an inner sleeve positioned within the first inner bore and the second inner bore. The sub may comprise a first half segment and a second half segment. Also, the second joint may contain an annular ring, and wherein the first half segment and the second half segment of the sub engage with the annular ring in order to prevent the first and second half segment from slipping down the pipe. The first inner bore may contain a first groove having first seal means disposed therein and the second inner bore may contains a second groove having second seal means disposed therein, and wherein the first seal means and the second seal means prevents a pressure from exiting the first inner bore and the second inner bore. The inner sleeve may contain an external thread that engages with an internal thread within the first inner bore. A pin connector may be disposed through the shell and engaging the first joint to prevent the shell from unscrewing.

Also disclosed is a method of connecting a first tubular with a second tubular. The method comprises providing the first tubular having outer threads with wedges at a bottom end of the first tubular; the second tubular having reciprocal wedges at a top end of the second tubular, and wherein the wedges and the reciprocal wedges cooperate to engage; a shell disposed about the first tubular, the shell having inner threads that cooperate with the outer threads of the first and second tubular; an inner sleeve positioned within a first inner bore of the first tubular.

The method further includes setting the second tubular with a slip means within a rotary table on a drill floor and lowering the first tubular. The method includes inserting the inner sleeve into a second inner bore of the second tubular. Next, the first tubular is rotated so that the wedges of the first tubular are aligned with the reciprocal wedges of the second tubular.

The method further includes lowering the first tubular into engagement with the second tubular, rotating the shell about the outer threads of the first tubular, and then rotating the shell about the outer threads of the second tubular so that the first tubular and the second tubular are connected.

The method may further comprise exerting a pulling force on the first tubular and the second tubular, and transferring the pulling force to the outer threads of the first tubular and the outer threads of the second tubular. In one preferred embodiment, the method includes exerting a rotating force on the first tubular and the second tubular, and transferring the rotational force to the wedges on the first tubular and the reciprocal wedges on the second tubular.

An advantage of the present invention includes obtaining a seal without having to torque the connections, wherein the prior art torquing of connections can lead to over torquing which can seriously damage the tubulars. Another advantage is that any torquing required by the operator to the tubular string will be transferred in the wedges. Another advantage is that no tongs are needed to make-up the connection.

Yet another advantage is that no fluid or pressure is held by the threads; rather, the sealing face occurs between the sealing sleeve and the seal members. Still yet another advantage is that the invention can be used with a multitude of tubulars that require connection. Yet another advantage is that the components of the invention can be replaced if damaged out in the field i.e. the operator can remove the worn parts and put a new part in its place. This includes, but not limited to, the sealing sleeve and the outer nut.

A feature of the present invention includes an inner seal sleeve that is easily replaceable. Another feature is that the seal members will be positioned within the bore of the tubulars and out of the flow area. Still yet another feature includes use of an outer nut shell that is threadedly connected to the first and second connection. Yet another feature is that the threads on the outer sleeve and tubular connections are rated very high for tensile strength, and therefore, an operator can exert significant pulling forces on the attached tubulars. Another feature is that the two connectors and the outer shell threads will not unscrew by any torquing force. A feature of the present invention is that the connection herein described can be used in many applications, including but not limited to, oil and gas drilling, production, completions, sub-sea applications as well as pipelines and flow lines.

BRIEF DESCRIPTION OF THE DRAWINGS

FIG. 8A is a perspective view of the wedges of the second tubular seen in FIG. 1.

FIG. 8B is a perspective view of the wedges of the first tubular seen in FIG. 1.

DETAILED DESCRIPTION OF THE PREFERRED EMBODIMENTS

Figure 1:
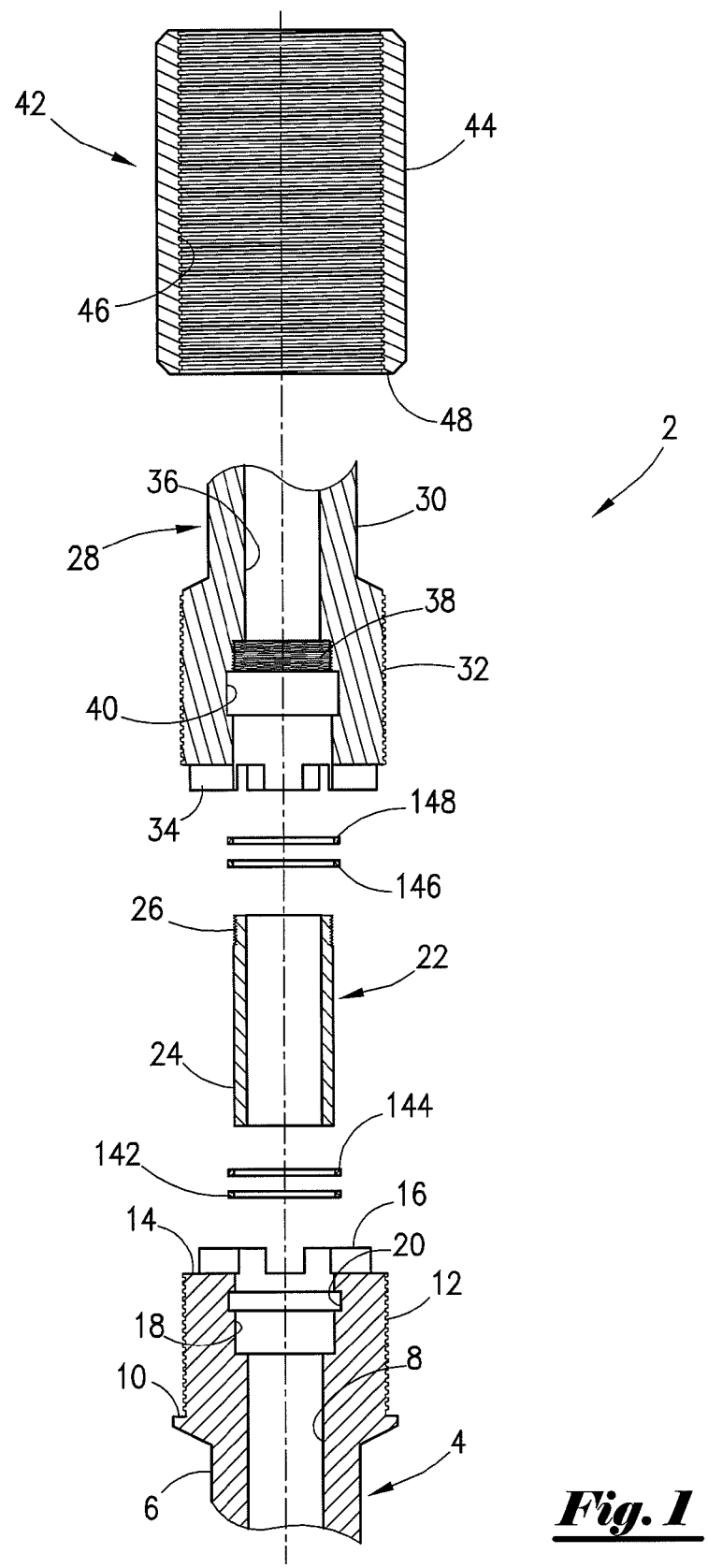
FIG. 1 is a disassembled cross-sectional view of a first preferred embodiment of the tubular connector.

Referring now to FIG. 1, a disassembled cross-sectional view of a first preferred embodiment of the tubular connector 2 will now be described. The tubular connector 2 includes a first tubular 4 that contains a first outer surface 6 and an inner bore surface 8. The outer surface 6 extends to the radial shoulder 10 which in turn leads to the outer thread portion 12. In the most preferred embodiment, the outer thread surface 12 is a standard acme type of thread having two (2) threads per inch that is commercially available from Frederick's Machine Shop Inc. under the name Acme Threads. As seen in FIG. 1, the outer thread portion extends to the end 14, and wherein end 14 has extending therefrom a plurality of protruding wedges 16. It should be noted that only a single wedge could have been provided. As shown in FIG. 1, the inner bore surface 8 extends to an expanded area 18 as well as containing the recess 20, wherein the recess 20 will contain seal means 142, 144, (also referred to as a seal assembly) as will be more fully described. The seal means 142, 144 is commercially available from Houston Packing Inc. under the name Poly Pack Packing. The sealing sleeve 22 is generally seen at 22. The sealing sleeve contains an outer surface 24 that extends to the external threads 26, wherein the external threads hold the sleeve 22 in place and keeps the sealing sleeve 22 from falling out when held above the lower connection just before mating. It should be noted that it is possible that the sealing sleeve not contain thread means and would therein be held in place by the seal means, or simply held by the first and second tubulars. Another purpose of the sealing sleeve 22 is to line-up the first and second tubulars during make-up.

FIG. 1 further depicts the second tubular 28, and wherein the second tubular 28 contains an outer surface 30 that extends to the outer thread surface 32, which in turn extends to the protruding wedges 34. As noted earlier, only a single wedge could be provided on each tubular end. In the most preferred embodiment, the outer thread surface 32 is a standard acme type of thread having two (2) threads per inch that is commercially available as previously noted. The protruding wedges 16 and the protruding wedges 34 will cooperate and engage so that a rotational movement of the connected tubulars will transfer the generated torque to the wedge bodies, as will be more fully explained later in the application. The second tubular 28 contains an inner bore surface 36, and wherein the inner bore surface 36 will extend to the internal thread portion 38 which in turn leads to the expanded area 40. The expanded area 40 will contain seal means 146, 148. FIG. 1 also shows the outer shell 42, sometimes referred to as the outer nut 42. The outer shell 42 contains an outer surface 44 which extends radially inward to the inner thread portion 46. The inner thread portion 46 is a standard acme type of thread having two (2) threads per inch that will cooperate and engage with the external threads 32 and 12. The outer shell 42 has the bottom end 48 that will abut the radial shoulder 10.

Figure 2:
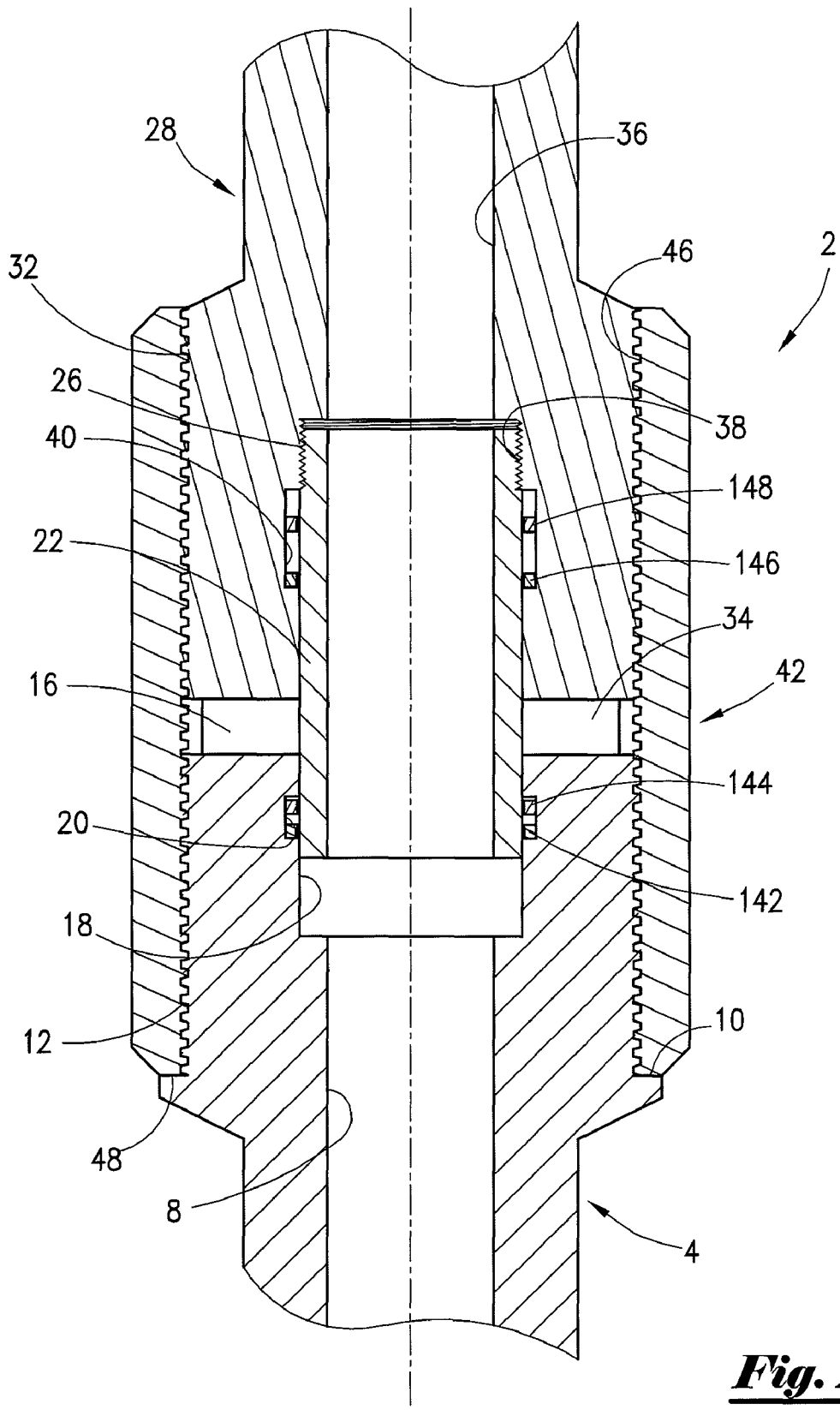
FIG. 2 is an assembled cross-sectional view of the tubular connector illustrated in FIG. 1.

Referring now to FIG. 2, an assembled cross-sectional view of the tubular connector 2 illustrated in FIG. 1 will now be described. It should be noted that like numbers appearing in the various figures refer to like components. Hence, the protruding wedges 16 and the protruding wedges 34 have been engaged. The exact dimensions of the wedges may vary. For instance, in one preferred embodiment, one wedge is larger than the rest so the two parts can mate in only one way to line up the outer threads so that the shell can makeup over the two parts. In another embodiment, all the wedges are the same size so the two parts need no alignment, because the two thread halfs can rotate on the lower part—not the two connections. The wedges will be explained in greater detail later in the application.

FIG. 2 shows the sealing sleeve 22 is in place, and wherein the sealing sleeve 22 has been threadedly connected to the internal threads 38 via external threads 26. FIG. 2 further depicts the seal assembly means 146, 148 that is contained within the expanded area 40 as well as the seal assembly means 142, 144 that is contained within the expanded area 20. In this way, pressure within the inner bore of the connections will be sealed and precluded from escaping from the internal bore into the atmosphere.

FIG. 2 depicts the inner thread portion 46 engaging the outer threads 32 and 12. By making up the first tubular 4 and the second tubular 28 this way, the outer threads become one constant threaded pattern thereby allowing for engagement with the inner thread portion 46 of the outer shell 42. Put another way, the outer threads become a continuous spiral thread pattern and the continuous spiral thread pattern formed when outer threads 12 and the outer threads 32 are coupled with the outer shell 42. The bottom end 48 will abut the radial shoulder 10.

Figure 3:
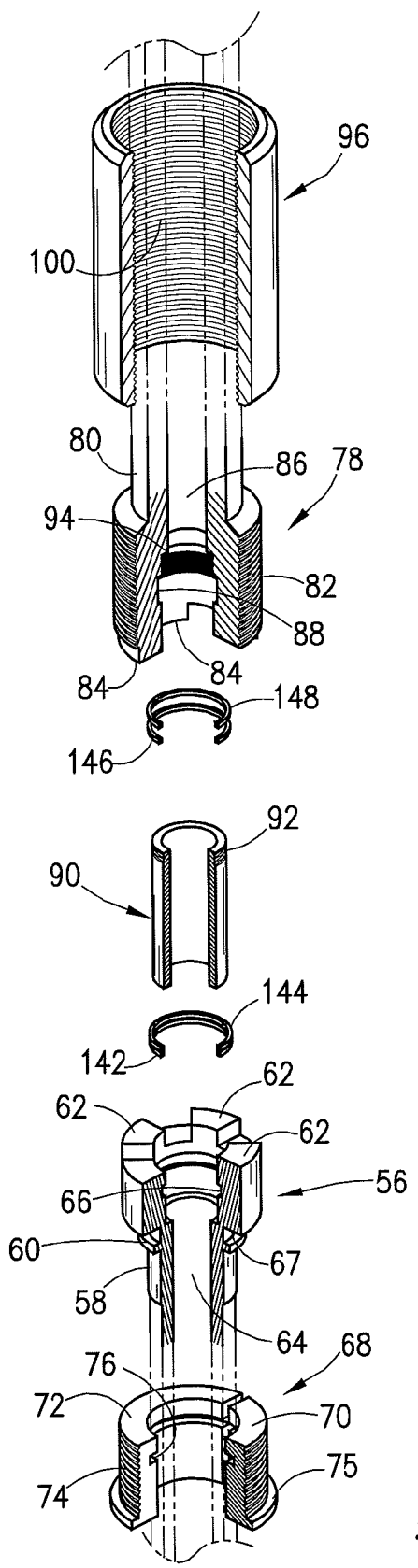
FIG. 3 is a disassembled partial cross-sectional perspective view of a second preferred embodiment of the tubular connector.

FIG. 3 illustrates a disassembled partial cross-sectional perspective view of a second preferred embodiment of the tubular connector. The embodiment of FIG. 3 is the most preferred embodiment of this application. A first tubular 56 is provided, wherein the first tubular 56 has an outer surface 58. The outer surface 58 contains an annular ring 60. The first tubular 56 has at one end the protruding wedges 62. The first tubular 56 further contains an inner bore surface 64, and wherein the inner bore surface 64 extends to the expanded recess seen generally at 66 for placement of seal means (such as o-rings) 142, 144. Another shoulder 67 is provided on first tubular 56, which will provide for load distribution when the tubular connection is undergoing tensional or compressional forces.

FIG. 3 depicts the sub 68 that will be disposed about the first tubular 56. More specifically, the sub 68 contains a first half section 70 and a second half section 72, and wherein both half sections 70, 72 are mirror images in the most preferred embodiment. The outer portion of the sub 68 contains the outer threads 74, and wherein the outer threads are the same type of threads previously described, namely a standard acme type of thread having two (2) threads per inch. The outer threads 74 extend to the radial shoulder 75. The sub 68 contains an inner portion and wherein the inner portion contains a radial groove 76, and wherein the radial groove 76 will cooperate with the annular ring 60 so that the sub 68 will be captured on the first tubular 56.

The second tubular 78 is depicted in FIG. 3, and wherein the second tubular 78 has an outer surface 80 that extends to a second outer surface, namely the outer threads 82. The outer threads 82 are the same type of threads previously described, namely a standard acme type of thread having two (2) threads per inch. The bottom end of second tubular 78 includes the protruding wedges 84, and wherein the protruding wedges 84 and the protruding wedges 62 will cooperate to engage. The second tubular 78 contains an inner portion 86 which in turn extends to the expanded recess 88 for placement of a seal assembly 146, 148 (which may be o-rings in one preferred embodiment), as will be described in greater detail later in the application.

The seal sleeve 90 contains an outer cylindrical surface that is adapted for insertion into the inner bores of the second tubular 78 and the first tubular 56. The seal sleeve 90 contains outer threads 92 that will engage with the internal threads 94 contained within the second tubular 78. FIG. 3 also depicts the outer shell 96, wherein the outer shell 96 has an outer surface that extends to the radial end 98. Extending radially inward is the inner threads 100 that will cooperate and engage with the outer threads 82 and 74, and wherein the inner threads are the same type of threads previously described, namely a standard acme having two (2) threads per inch.

Figure 4:
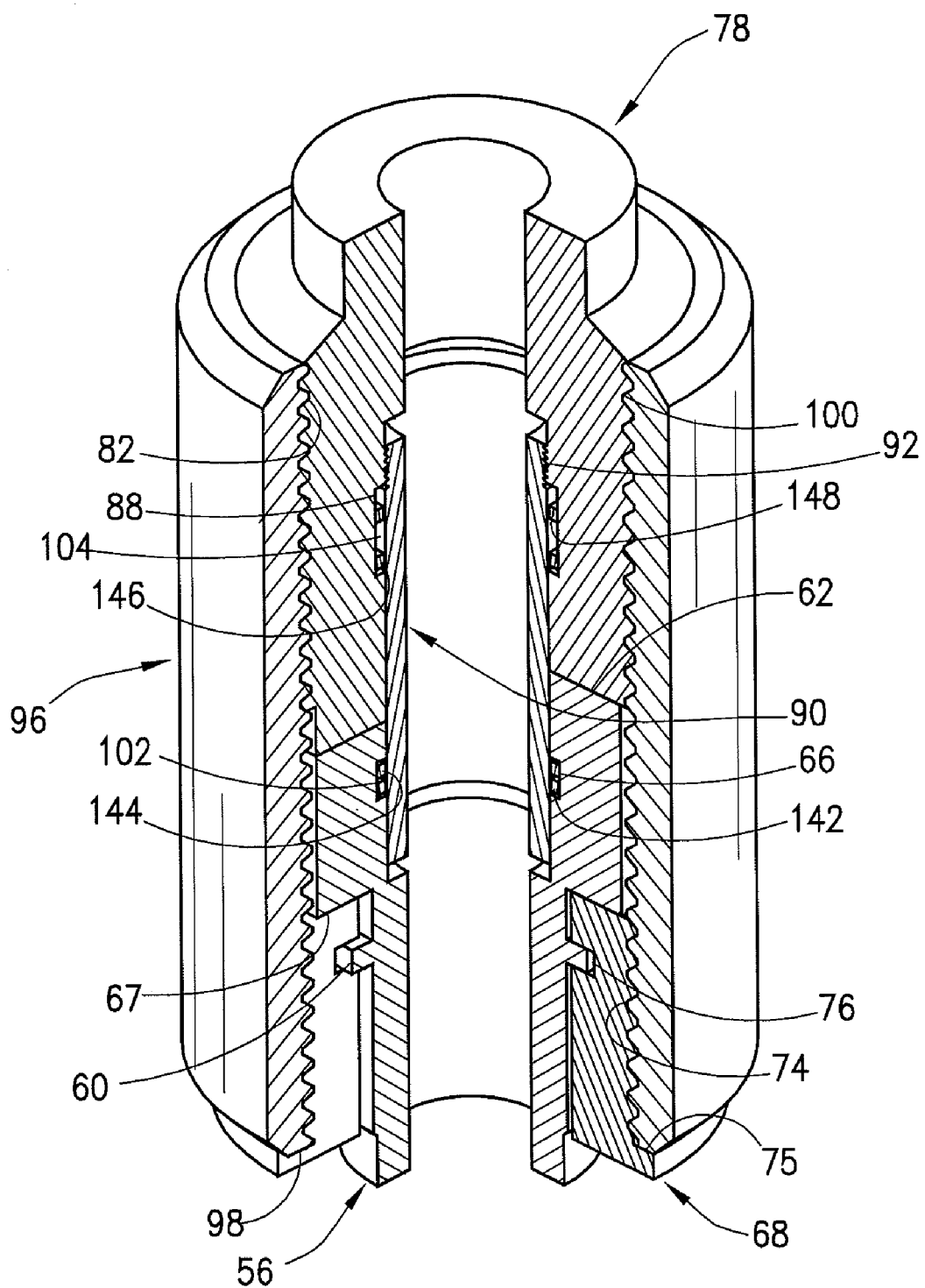
FIG. 4 is an assembled partial cross-sectional perspective view of the tubular connector illustrated in FIG. 3.

Referring now to FIG. 4, the assembled partial cross-sectional perspective view of the tubular connector illustrated in FIG. 3 will now be described. More specifically, the first tubular 56 and the second tubular 78 have been engaged via the protruding wedges 62, 84 (wedge 84 not seen in this view). The sub 68 is in place about the first tubular 56 and wherein the annular ring 60 of the first tubular 56 is engaging the radial groove 76 of sub 68. The outer shell 96 has been screwed into place as shown in FIG. 4; hence, the inner threads 100 have engaged the outer threads 82 and 74. Sub 68 will allow the receptacle wedges to be put in place at any turn since the sub 68 can be rotated about the annular ring 60. In other words, with the design of sub 68, there is no lining up the outer threads to make up the outer nut 96 to the sub 68, the operator can simply rotate sub 68 until the outer threads form a continuous thread pattern relative to the inner threads 100 as seen in FIG. 4.

FIG. 4 further depicts the continuous spiral thread pattern of the invention, and more specifically, the continuous spiral thread pattern formed when outer threads 82, 74 are coupled with the outer shell 96 via inner threads 100. The radial end 98 engages the radial shoulder 75. The seal assembly 142, 144 is positioned within the recess 66 and the seal-assembly 146, 148 is positioned within the recess 88. Therefore, with the seal sleeve 90 in place and threadedly engaged with the second tubular 78, internal pressure will be prevented from escaping into the outer areas, as will be appreciated by those of ordinary skill in the art. In the event that the operator wishes to rotate either the first tubular 56 and/or the second tubular 78, the rotation force (torque) will be transferred to the wedges. A pull force will be transferred to the external threads 82, internal threads 100, then to the external threads 74, and to shoulder 67 via the top portion of half sections 70, 72, in accordance with the teachings of the present invention. A compressional force will transfer against external threads 82, then to internal threads 100, then to external threads 74 and the top portion of half section 70, 72 via shoulder 67.

Figure 5:
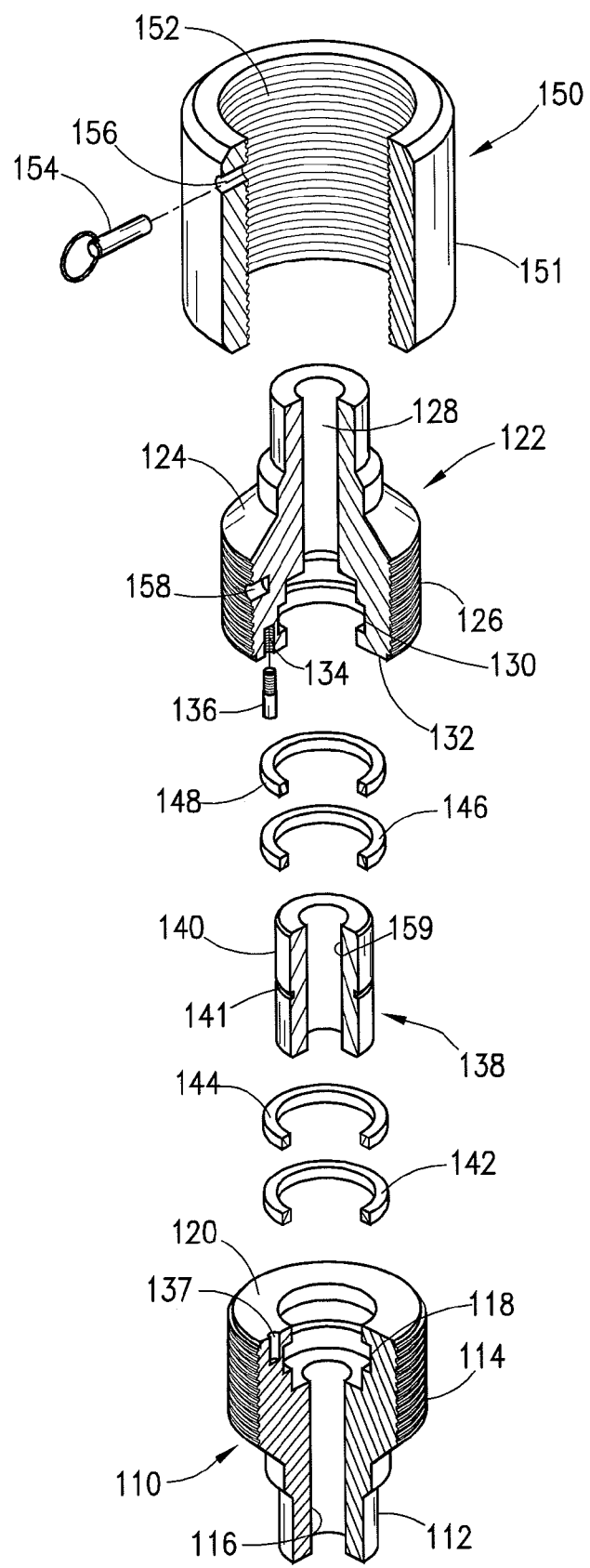
FIG. 5 is a disassembled cross-sectional perspective view of a third preferred embodiment of the tubular connector.

Referring now to FIG. 5, a disassembled cross-sectional perspective view of a third preferred embodiment of the tubular connector will now be described. In this third embodiment, a first tubular member 110 is shown, and wherein the first tubular member 110 contains a first outer surface 112 that extends to the outer thread surface 114. The outer thread surface 114 contains the standard acme thread type as previously noted. Extending radially inward is the inner bore surface 116, and wherein the inner bore surface 116 extends to an expanded recess 118. The first tubular member 110 has radial ending surface 120.

FIG. 5 further depicts the second tubular member 122 that contains a first outer surface that extends to a chamfered surface 124 which in turn extends to the outer threads 126, wherein outer threads 126 are the same as outer threads 114.

Extending radially inward, the second tubular member 122 contains an inner bore surface 128 that extends to the expanded recess 130. The second tubular member 122 has radial ending surface 132, and wherein the radial ending surface has an aperture 134 therein for placement of a pin 136. Pin 136 may be threadedly engaged with the aperture 134. A reciprocal aperture 137 is positioned within the radial ending surface 120. The purpose of the pin 136 is for alignment of the first tubular member 110 and the second tubular member 122 when making-up the connections. In other words, the pin 136 will allow the first tubular 110 to be placed such that the outer threads align. Hence, as member 110 abuts member 122, with the pin 136 in the aperture 134, the outer threads 114, 126 form a continuous thread pattern.

A seal sleeve 138 is also shown in FIG. 5. The seal sleeve 138 has an outer surface 140 and an inner surface 159. Note that the outer surface 140 has a radial mark 141 so that the operator can visually determine whether the seal sleeve 138 is in proper position within both first tubular member 110 and second tubular member 122. FIG. 5 further depicts a seal assembly 142, seal assembly 144, seal assembly 146 and seal assembly 148, wherein the seal assemblies 142 and 144 are disposed within the recess 118 and the seal assemblies 146, 148 are disposed within the recess 130. The seal assemblies 142, 144, 146, 148 are commercially available from Houston Packing Inc. under the name Poly Pack Packing.

The outer shell 150, sometimes referred to as the outer nut 150, is shown in FIG. 5, and wherein the outer sleeve 150 has an outer surface 151, and extending radially inward is the inner thread 152 which will engage and cooperate with the outer threads 114 and 126. The inner thread 152 is of the same type of thread as outer threads 114, 126. The pin 136 and the sleeve 138 also act to align the outer threads of the first tubular 110 and the second tubular 122 so that the shell 150 will threadedly make-up with the outer threads.

Also shown is the pin 154 that is inserted into an aperture 156 in the outer shell 150 and aperture 158 in the second tubular 122. The pin 154 is inserted and set in order to keep the outer shell 150 from backing-off from the tubular member 110 and 122. The lock pin 154 will lock outer shell 150 and second tubular member 122 together and prevent unscrewing. The operator can pull pin 154 to unscrew and take apart, when desired.

Figure 6:
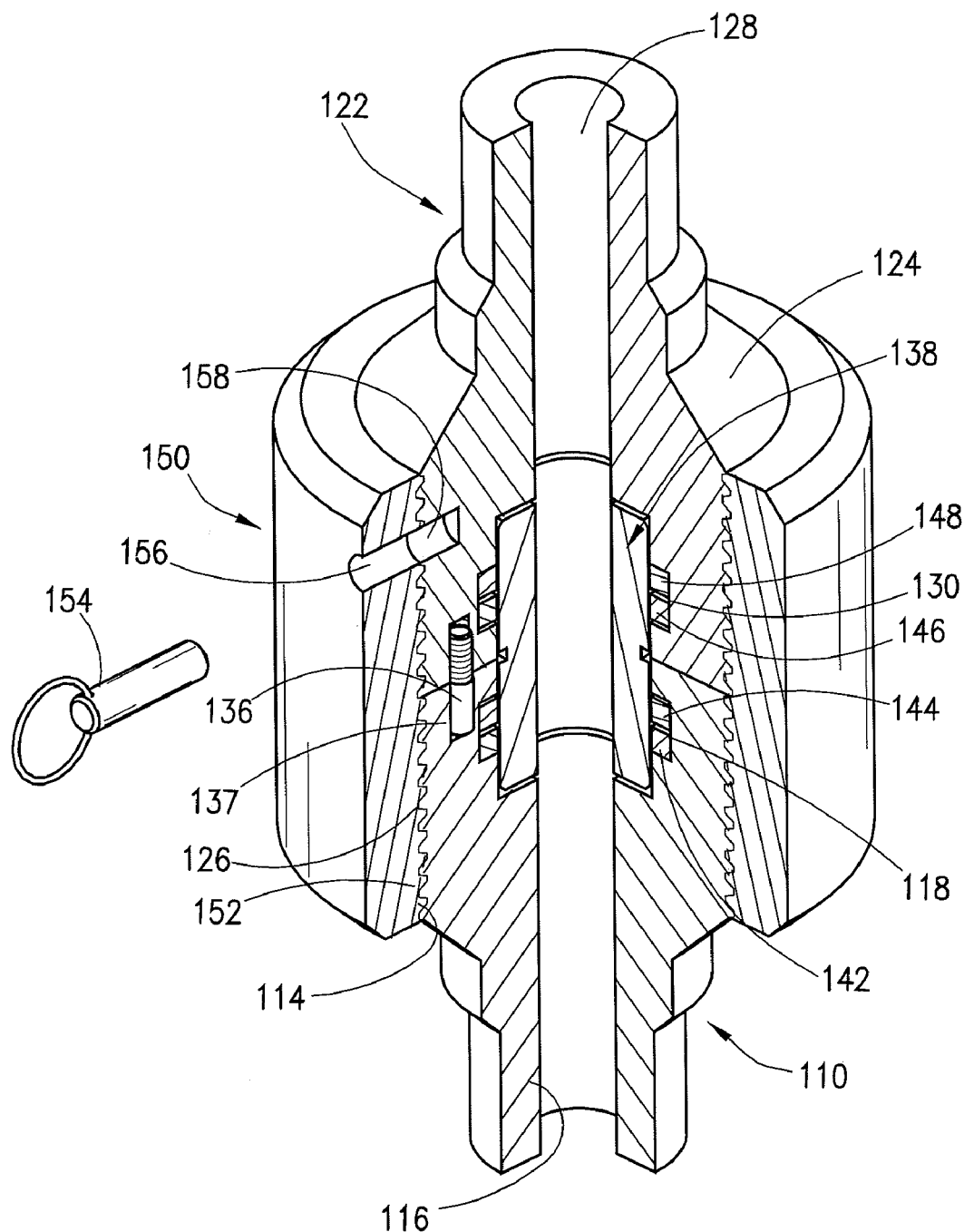
FIG. 6 is an assembled partial cross-sectional perspective view of the tubular connector illustrated in FIG. 5.

FIG. 6 is an assembled partial cross-sectional perspective view of the tubular connector illustrated in FIG. 5. Thus, the first tubular member 110 is shown abutting the second tubular member 122. The seal assemblies 142, 144 are shown within the recess 118, and the seal assemblies 146, 148 are shown within the recess 130. The seal sleeve 138 is disposed within the inner bores of first tubular member 110 and second tubular member 122 so that an internal pressure will be precluded from escaping to the outer portions. The pin 136 is positioned with the aperture 137. FIG. 6 further depicts the continuous spiral thread pattern of the invention, and more specifically, the continuous spiral thread pattern formed when outer threads 114 and the outer threads 126 are coupled with the inner threads 152 of the outer shell 150.

Figure 7:
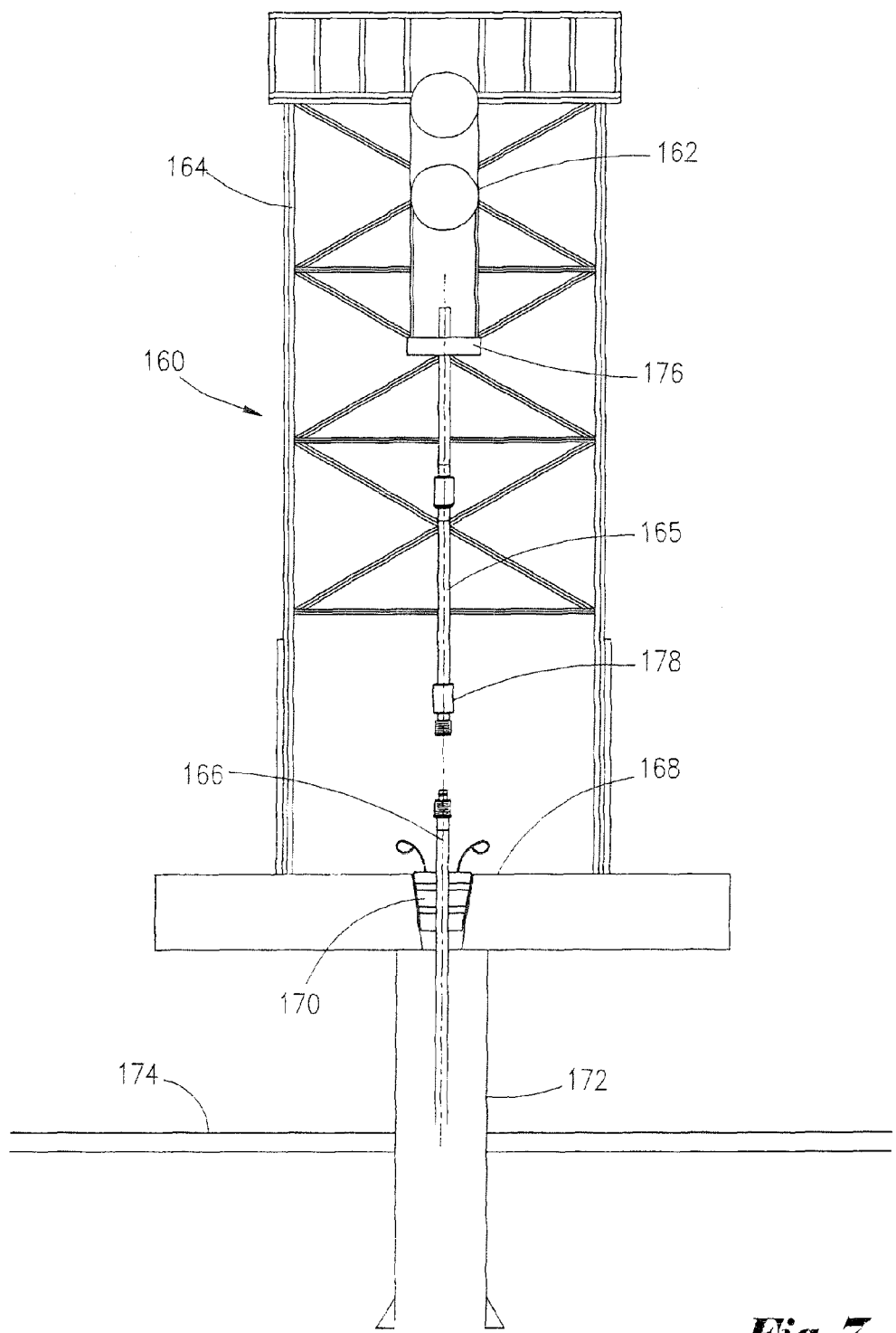
FIG. 7 is a schematic of a tubular connector of the present invention being made-up on a drilling rig.

Referring now to FIG. 7, a schematic of the tubular connector of the present invention being made-up on a drilling rig 160 will now be described. A block means 162 is suspended in the derrick 164 and a first tubular 165 is suspended therefrom. A second tubular 166 is shown within a rotary table 168 on the rig floor. The second tubular 166 is supported within the rotary table 168 via slip means 170 well known in the art. A casing string 172 extends below the surface into subterranean zones 174. The second tubular 166 has the outer threads as previously described.

As noted earlier, FIG. 7 also depicts the second tubular 165 that is suspended from the block 162 and connected via elevators 176. The first tubular 165 has associated therewith the outer nut 178 (also referred to as the outer shell 178) with outer threads, as previously described.

A method of connecting the first tubular 165 with the second tubular 166 is disclosed. The method includes setting the second tubular 166 in the slip means 170 within the rotary table 168 on the drill floor, and lowering the first tubular 165 via the block 162. Next, the inner seal sleeve is inserted into the inner bore of the second tubular 166, and the first tubular 165 is rotated so that the wedges of the first tubular 165 are aligned with the reciprocal wedges of the second tubular 166. The method includes lowering the first tubular 165 into engagement with the second tubular 166 via the block 162, and rotating the outer nut/shell 178 about the outer threads of the first tubular 165, and rotating the shell 178 about the outer threads of the second tubular 166 so that the first tubular 165 and the second tubular 166 are connected. The slips 170 can be removed and the tubular string can be lifted and/or lowered via the block 162 as well understood by those of ordinary skill in the art.

The method may further include exerting a pulling force on the first tubular 165 and the second tubular 166 and transferring the pulling force to the outer threads of the first tubular and the inner threads of the shell then to the outer threads of the second tubular. The method may also include exerting a rotating force on the first tubular 165 and the second tubular 166, and transferring the rotational force to the wedges on the first tubular 165 and the reciprocal wedges on the second tubular 166. It should be noted that the first tubular 165 and the second tubular 166 can be made-up while in the horizontal position by lining up and pushing the first tubular 165 and the second tubular 166 together, and then turning the outer shell 178 to cover the first tubular 165 and the second tubular 166 threads.

FIG. 8A is a perspective view of the protruding wedges 16 of the second tubular 4 taken from FIG. 1. More specifically, the protruding wedges 16 of the preferred embodiment of FIG. 8A depict a first wedge 182 having an outer width of W1, second wedge 184 having an outer width of W2, third wedge 186 having an outer width of W3, and fourth wedge 188 having an outer width of W4. Due to the arcuate nature of the protruding wedges on the tubular members, the inner widths are less in length. The radial spaces 190, 192, 194, and 196 are also shown.

Referring now to FIG. 8B, a perspective view of the protruding wedges 34 of the first tubular 4 28 taken from FIG. 1. will now be described In accordance with the teachings of the present invention, the protruding wedges 34 will be in reciprocal alignment; therefore, the wedges 16 and 34 cooperate to engage. As seen in the preferred embodiment of FIG. 8B, the protruding wedges 34 depict a first wedge 200 having an outer width of W5, second wedge 202 having an outer width of W6, third wedge 204 having an outer width of W7, and fourth wedge 206 having an outer width of W8. Due to the arcuate nature of the protruding wedges on the tubular members, the inner widths are less in length. The radial spaces 208, 210, 212, and 214 are also shown.

As shown, the wedge 182 will fit into radial space 214; the wedge 184 will fit into radial space 208; the wedge 186 will fit into radial space 210; and, the wedge 188 will fit into radial space 212. Also, the wedge 200 will fit into radial space 190; the wedge 202 will fit into radial space 192; the wedge 204 will fit into radial space 194; and, the wedge 206 will fit into radial space 196. According to the teachings of the present invention, the number and size of the protruding wedges and radial spaces can be changed, and wherein the reciprocal protruding wedges and radial spaces would also have to changed in order to cooperate and engage. For instance, rather than have four protruding wedges per face, only one wedge per face is required. Alternatively, the width W1 of wedge 182 could be lengthened and wherein the width of the radial space would in turn change. Also, the actual shape of a wedge and radial space can be changed, and wherein the reciprocal wedge would be changed accordingly. It should also be noted that the wedges can be made to be replaceable fingers and/or pins. The fingers and/or pins can be removed and replaced due to various factors such as wear and tear from use.

Figure 9A:
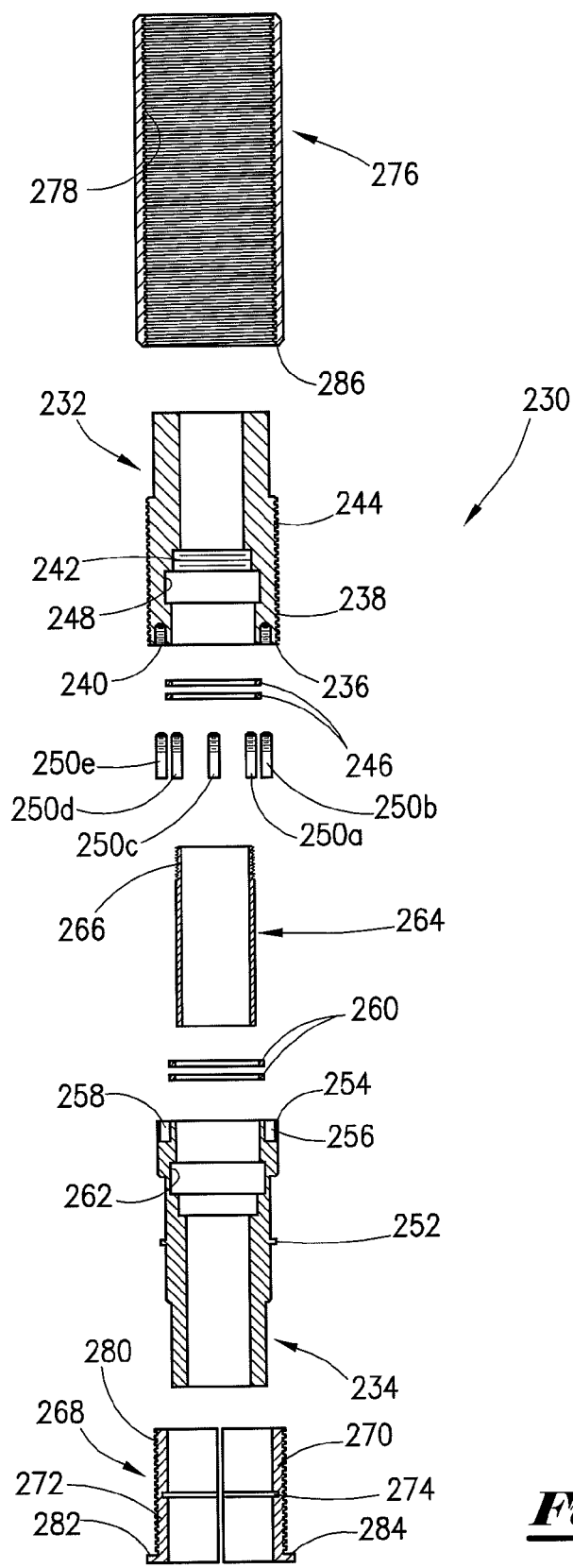
FIG. 9A is an exploded, cross-sectional view of a fourth preferred embodiment of the tubular connector.

Referring now to FIG. 9A, an exploded, cross-sectional view of a fourth preferred embodiment of the tubular connector 230 will now be described. This fourth embodiment includes a first tubular 232 and a second tubular 234. The first tubular 232 includes a radial end 236, and wherein the radial end 236 contains a plurality of apertures 238, 240. The inner bore of the first tubular 232 contains internal thread means 242. The outer surface of the first tubular 232 contains outer threads 244. FIG. 9A shows the seal means 246 that will be disposed within the cavity 248. FIG. 9a further depicts the plurality of pins 250a, 250b, 250c, 250d, 250e that will be placed within reciprocal apertures.

The second tubular 234 includes an outer surface containing an annular ring 252, and wherein the outer surface extends to the radial end 254 that includes a plurality of apertures (such as 256, 258). The pins 250a-250e will also engage with the apertures on the radial end 254. The seal means 260 will be placed within the cavity 262. FIG. 9A also depicts the inner sleeve 264 that has the external threads 266, and wherein the inner sleeve 264 will be disposed within the inner bores of the first tubular 232 and the second tubular 234. The external threads 266 engage with the internal threads 242. FIG. 9A also depicts the sub 268, and wherein sub 268 consist of a first half segment 270 and a second half segment 272. The inner bore of sub 268 contains an annular groove 274, and wherein the annular groove 274 will engage and cooperate with the annular ring 252 to prevent the sub 268 from slipping during make-up and break-down? FIG. 9A also depicts the outer shell 276, and wherein the outer shell 276 contains inner thread means 278 that will engage with the outer thread means 244 and outer threads means 280 of the sub 268. Note that outer threads 280 are disposed as a continuous thread pattern on half segment 270 and half segment 272. As noted earlier, the threads can be, for instance, acme threads.

Figure 9B:
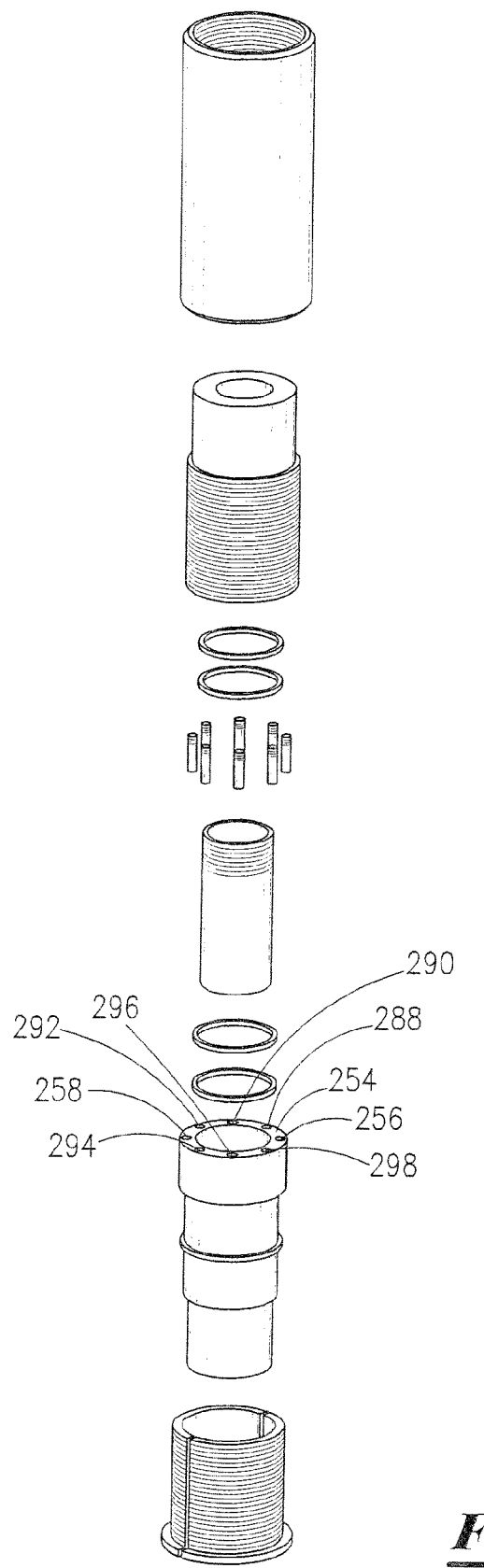
FIG. 9B is a perspective view of the fourth preferred embodiment of the tubular connector seen in FIG. 9A.

The shoulder 282 and the shoulder 284 will abut the end 286 of the outer shell 276 when made-up. Hence, when made-up, the any torque will be transmitted to the pins 250a-250e, and any tensional force will be transmitted to the threads, as previously described. Referring to FIG. 9B, a perspective view of the fourth preferred embodiment of the tubular connector seen in FIG. 9A. FIG. 9B shows in particular the radial face 254 that has contained therein apertures 256, 258, 288, 290, 292, 294, 296, 298 for placement of the pins 250a-250e.

Figure 10A:
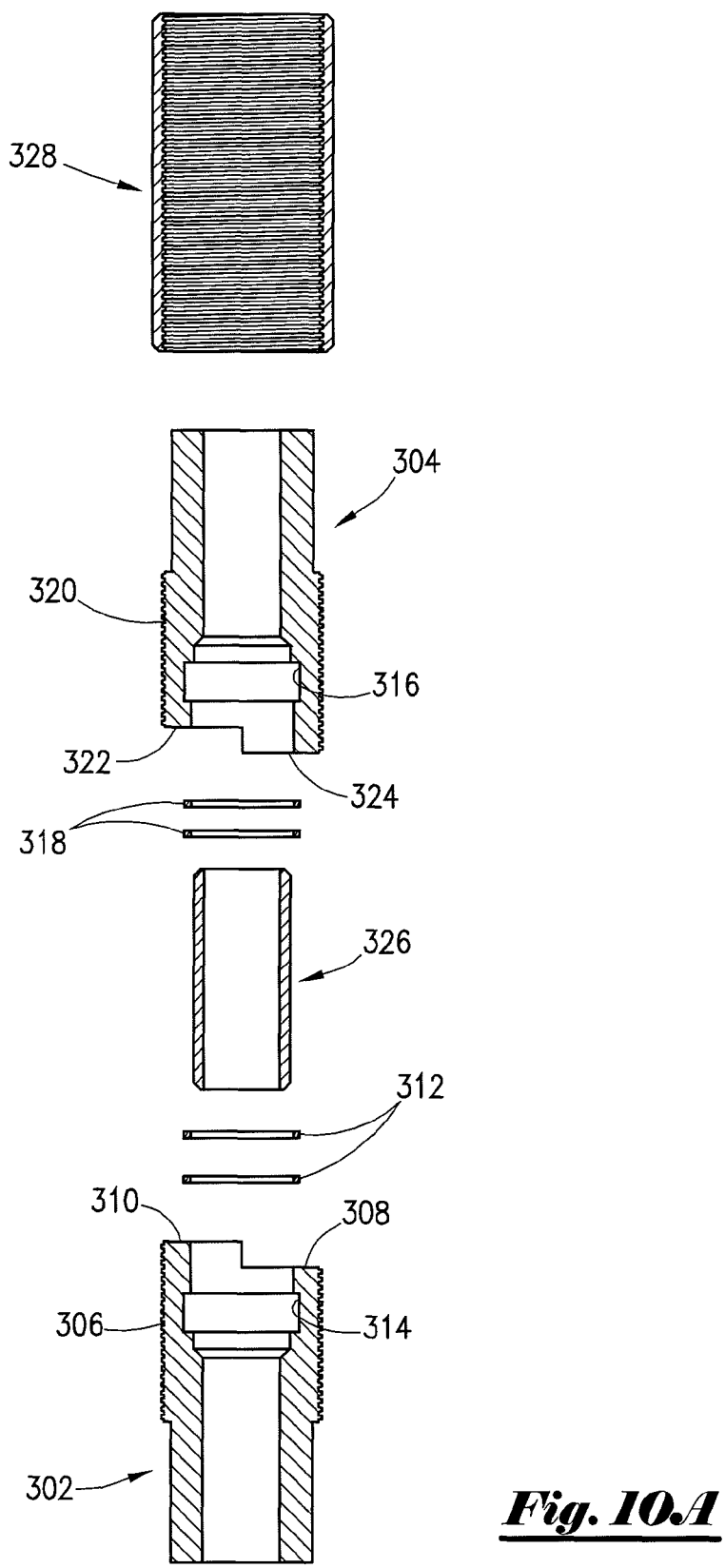
FIG. 10A is an exploded, cross-sectional view of a fifth preferred embodiment of the tubular connector.

Referring now to FIG. 10A, an exploded, cross-sectional view of a fifth preferred embodiment of the tubular connector will now be described. This fifth embodiment has a first tubular 302 and a second tubular 304, and wherein the first tubular 302 has outer threads 306 and the radial end 308. The radial end 308 has the single wedge portion 310, which may be referred to as the single finger portion 310. FIG. 10A further depicts the seal means 312 that will be disposed within the recess 314. The second tubular 304 also has a recess 316 for placement of the seal means 318. The second tubular 304 also contains the outer thread means 320 which extend to radial end 322, and wherein radial end 322 contains the single wedge portion 324, which may be referred to as the single finger 324. The wedge portion 324 and the wedge portion 310 will cooperate and engage in order to apply torque, as previously described.

Figure 10B:
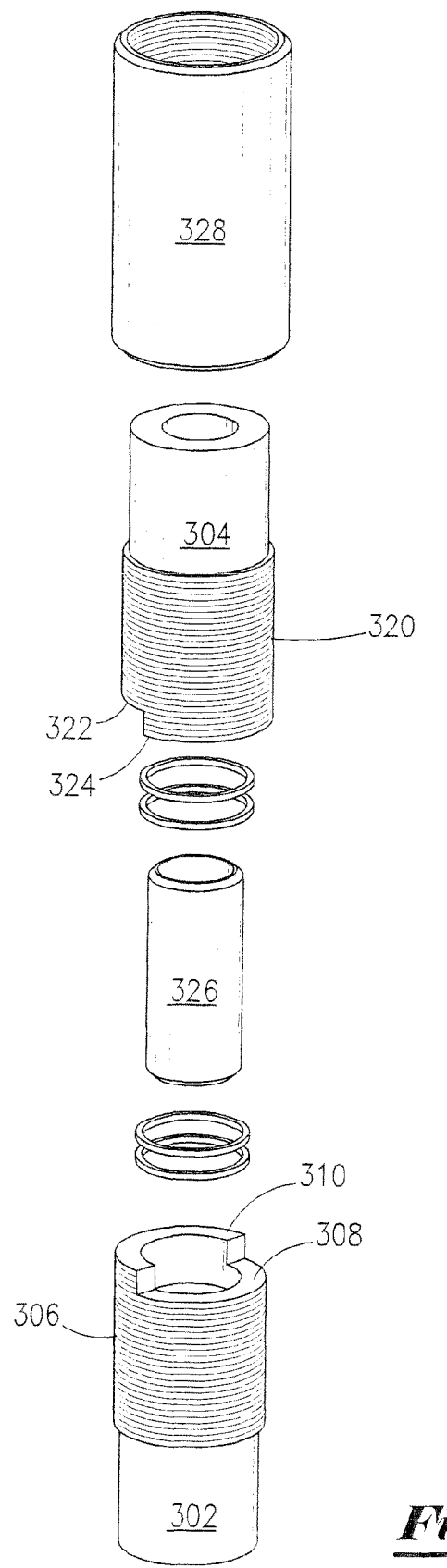
FIG. 10B is a perspective view of the fifth preferred embodiment of the tubular connector seen in FIG. 10A.

FIG. 10A further depicts the inner sleeve 326 that is disposed within the inner bores of the tubulars 302, 304, and the outer shell 328. The outer shell 328 will cooperate and engage with the outer thread means 306 and 320. FIG. 10B is a perspective view of the fifth preferred embodiment of the tubular connector seen in FIG. 10A. Hence, FIG. 10B depicts the single wedge portion 310 which is essentially a finger configured in a semi-circular pattern. FIG. 10B also depicts the single wedge portion 324 which is a reciprocal finger configured in a semi-circular pattern that will cooperate and engage with the single wedge portion 310 in order to apply torque.

Figure 11A:
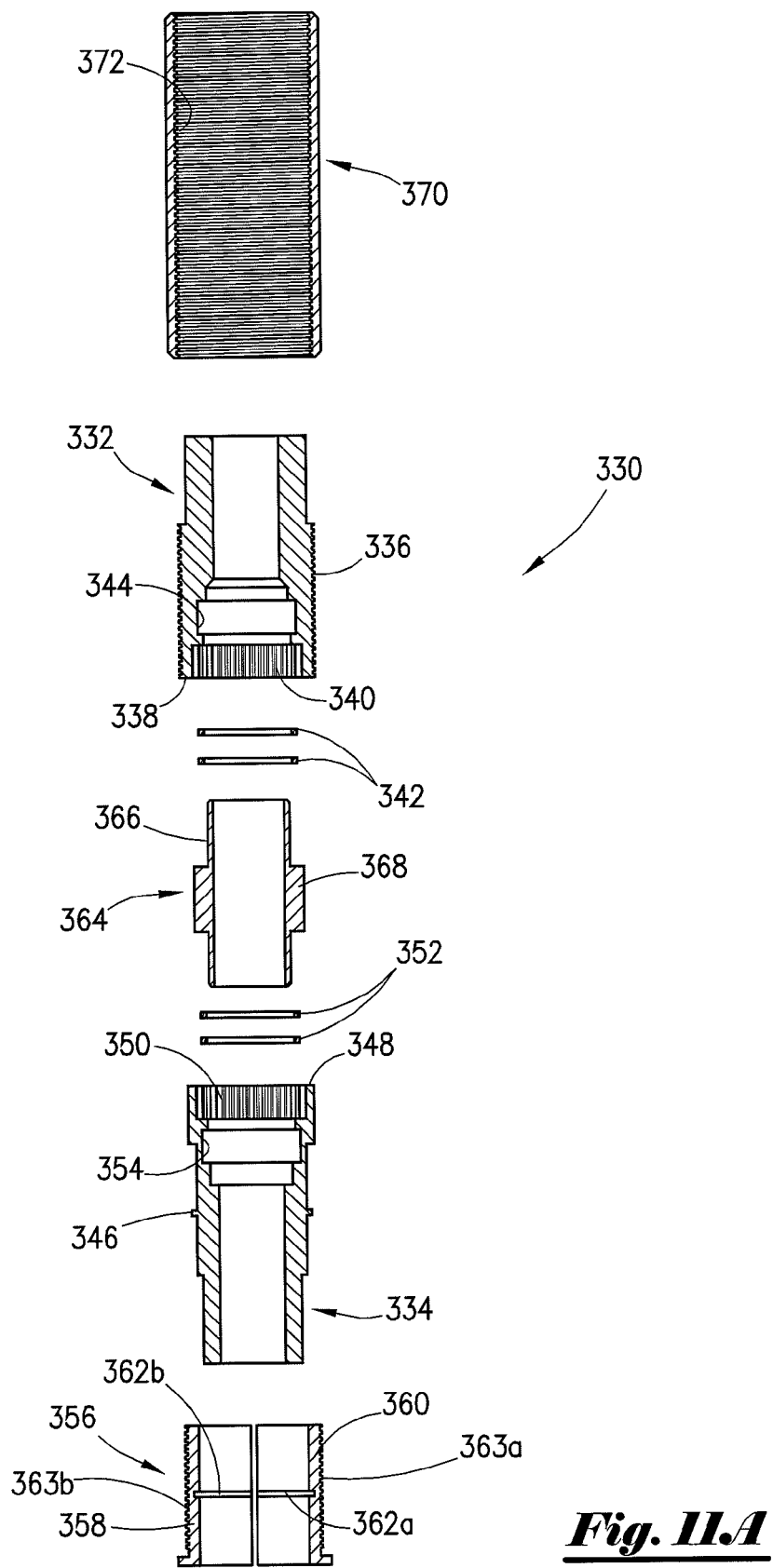
FIG. 11A is an exploded, cross-sectional view of a sixth preferred embodiment of the tubular connector.

Referring now to FIG. 11A, an exploded, cross-sectional view of a sixth preferred embodiment of the tubular connector 330 will now be described. The tubular connector 330 includes the first tubular 332 and the second tubular 334, and wherein the first tubular 332 has outer thread means 336 and the radial end 338. The radial end 338 contains an internal rack 340, and wherein the internal rack 340 contains . . . a tooth-type of profile. FIG. 11A further depicts the seal means 342 that will be contained within the recess 344. The second tubular 334 contains an annular ring 346 as well as the radial end 348, and wherein the radial end 348 contains the internal rack 350, and wherein the internal rack 350 contains . . . a tooth-type of profile that will cooperate with the internal rack 340 as will be fully set out below.

FIG. 11A further depicts the seal means 352 that will be disposed within the recess 354. The sub 356 will contain first segment 358 and second segment 360, and wherein on the inner portion will be the annular groove 362a, 362b. The annular ring 346 and the annular grooves 362a, 362b will engage and cooperate so that the sub 356 does not slip during make-up and break-down. As shown, the sub 356 contains outer thread means 363a, 363b. The inner sleeve 364 having an outer surface 366 is shown, and wherein an outer rack 368 is disposed about the outer surface 366. The outer rack 368 will have a reciprocal tooth-type of profile that will cooperate with and engage internal rack 340 and internal rack 350. The outer shell 370 is shown having internal thread means 372, and wherein the internal thread means 372 will engage and cooperate with the outer thread means 336 of first tubular 332 and outer thread means 360 of the sub 356.

Figure 11B:
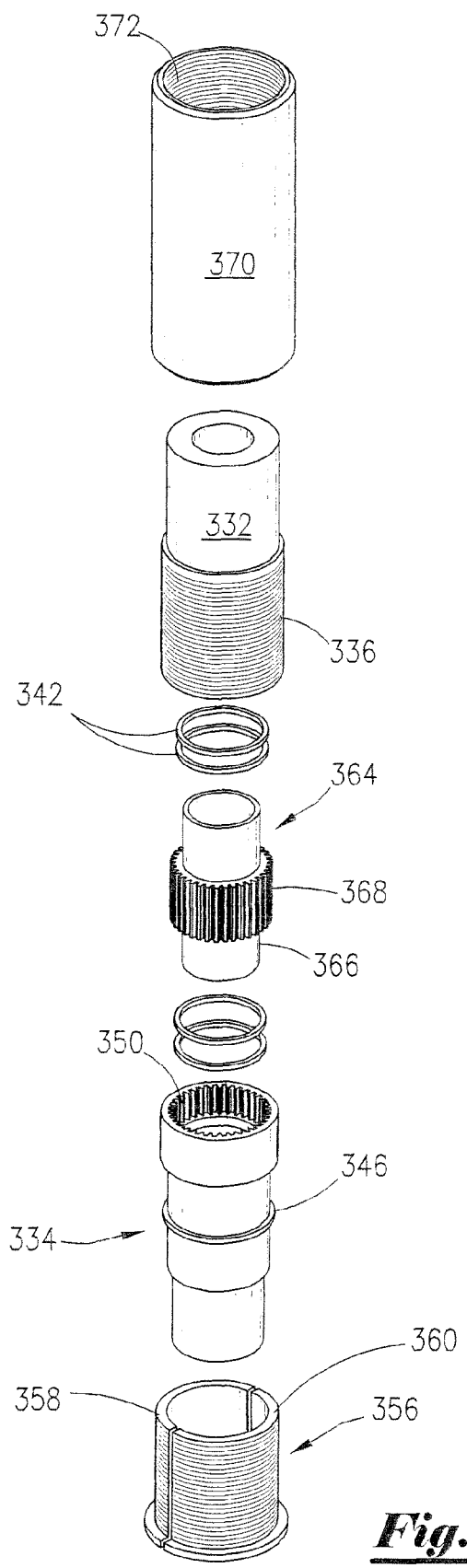
FIG. 11B is a perspective view of the sixth preferred embodiment of the tubular connector seen in FIG. 11A.

Referring now to FIG. 11B is a perspective view of the sixth preferred embodiment of the tubular connector 330 seen in FIG. 11A. Hence, the internal rack 340 is shown as well as the reciprocal outer rack 368, and wherein the teeth of outer rack 368 will cooperate and engage with the teeth of inner rack 340 so that torque can be transferred via the racks.

Figure 12A:
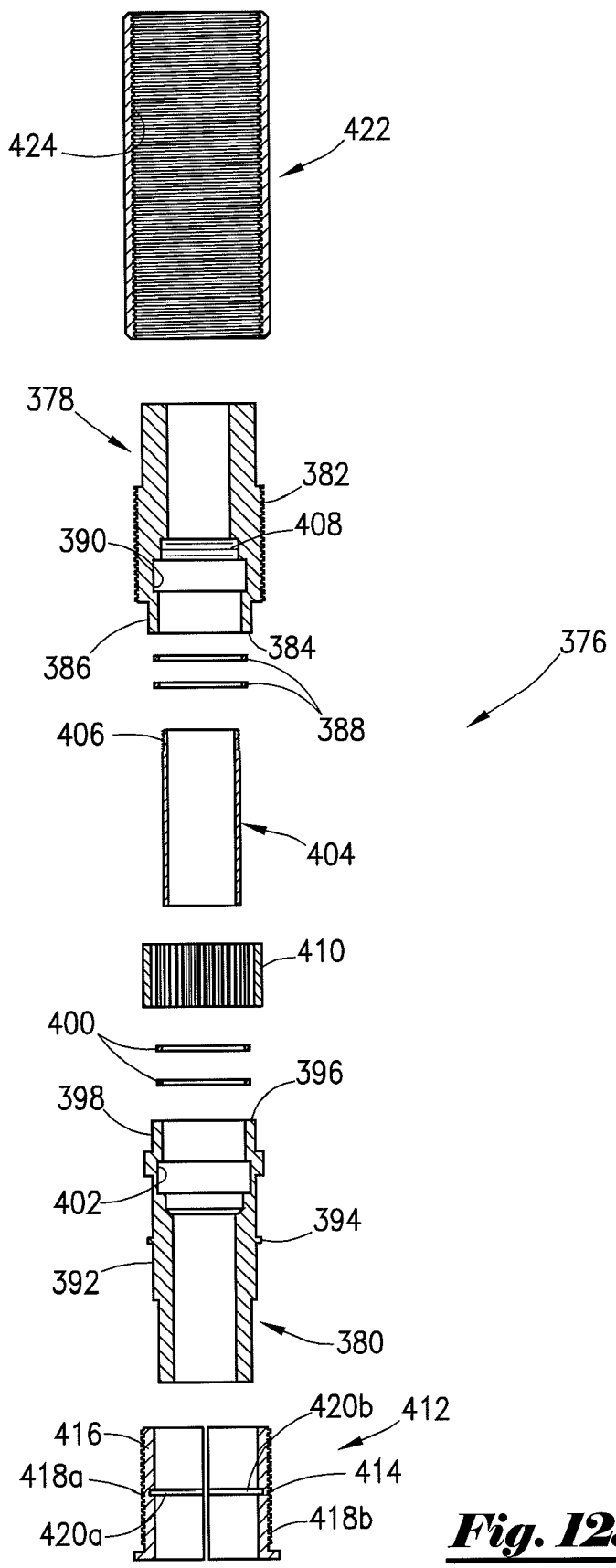
FIG. 12A is an exploded, cross-sectional view of a seventh preferred embodiment of the tubular connector.

FIG. 12A is an exploded, cross-sectional view of a seventh preferred embodiment of the tubular connector. More specifically, the tubular connector 376 of FIG. 12 illustrates the first tubular 378 and the second tubular 380. The first tubular 378 has outer thread means 382 that extend to the end 384, and wherein the external rack 386 is disposed about the end 384. FIG. 12A further shows the seal means 388 that will be placed into the recess 390. The second tubular 380 contains an outer surface 392 that includes an annular ring 394. The outer surface 392 terminates at end 396, and wherein the end 396 includes the external rack 398. The seal means 400 will be placed into the recess 402. The inner sleeve 404 is shown along with the external threads 406 that will engage with internal threads 408 of the first tubular 378.

FIG. 12A further depicts the sleeve with internal rack 410 (sometimes referred to as gear 410), and wherein the internal rack 410 will cooperate and engage with the external rack 386 and the external 398. The sub 412 contains a first half segment 414 and a second half segment 416 and wherein said half segments contain an outer thread means 418a, 418b, as previously described. The inner portion of the sub 412 contains the annular groove 420a, 420b for engagement with the annular ring 394. FIG. 12A also illustrates the outer shell 422, and wherein the outer shell 422 contains the internal threads 424 that will cooperate and engage with the outer theards 382 and outer threads 418a, 418b.

Figure 12B:
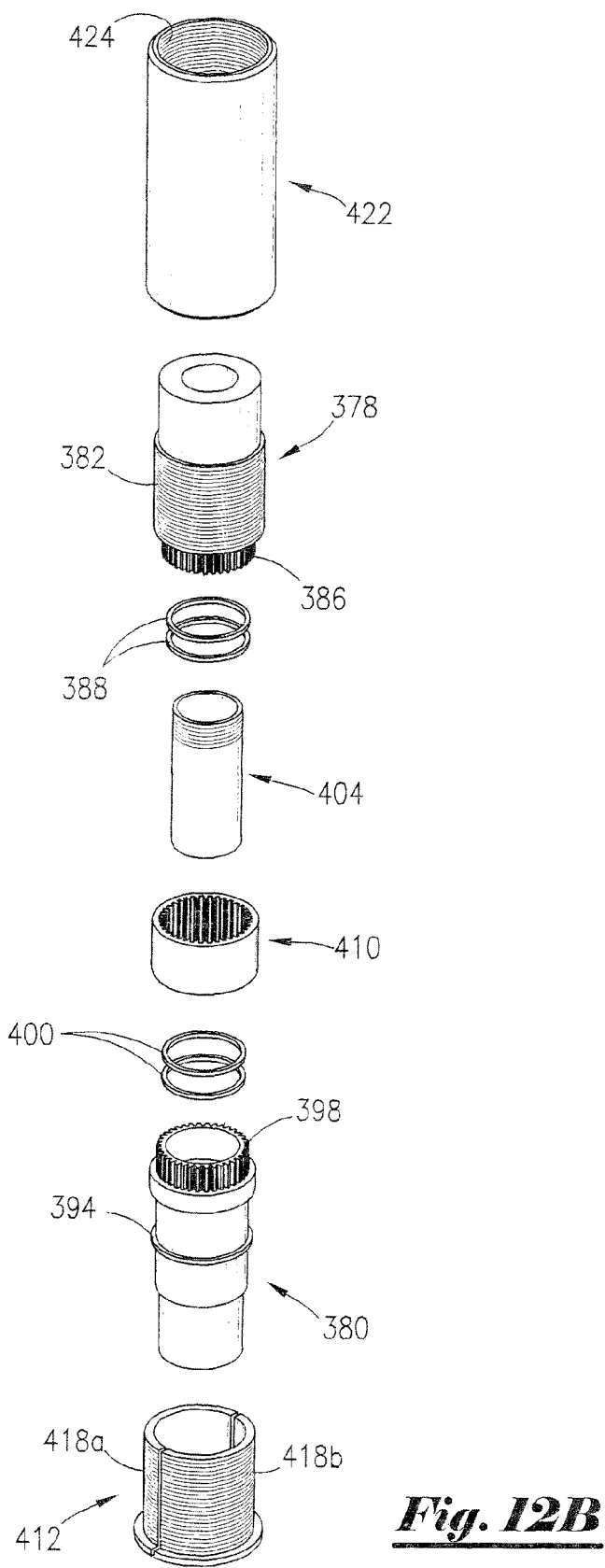
FIG. 12B is a perspective view of the wedges of the seventh preferred embodiment of the tubular connector seen in FIG. 12A.

Referring now to FIG. 12B, a perspective cross-sectional view of the seventh preferred embodiment seen in FIG. 12A will now be described. The external racks 386 and 398 are shown, along with the internal rack 410. The outer shell 422, and in particular the inner threads 424 will engage the external threads 382, and external threads 418a, 418b as previously described. A torque force will be transmitted via the racks 386, 398 and 410.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a review thereof.

I claim:

1. A tubular connection comprising:
    a first joint having a single continuous outer threads, a first inner bore, and a wedge at a bottom end of said first joint;
    a second joint having a second inner bore, and a reciprocal wedge at a top end of said second joint, wherein said wedge and said reciprocal wedge cooperate to engage one another and thereby said wedges transmit torque between said first and second joints;
    a sub having a single continuous outer thread, said sub being a separate element from said second joint, disposed about said second joint and rotatable and slidable thereon;
    a shell having a single continuous inner thread that cooperates and fastens with the single continuous outer threads of said first joint and said sub; and
    an inner sleeve positioned within said first inner bore and said second inner bore.

2. The tubular connection of claim 1 wherein said first inner bore contains a first groove having first seal means disposed therein and said second inner bore contains a second groove having second seal means disposed therein, wherein said first seal means and said second seal means prevents a pressure from exiting the first inner bore and the second inner bore.

3. The tubular connection of claim 2 wherein said inner sleeve contains an external thread that engages with an internal thread within the first inner bore.

4. The tubular connection of claim 3 wherein said outer threads of said first joint and said sub are an acme thread.

5. The tubular connection of claim 1 wherein said first joint and said second joint form part of a work string on a drilling rig.

6. The tubular connection of claim 1 wherein said sub comprises a first half segment and a second half segment, each of the two half segments comprising separate bodily structures which engage one another, fitting around and closely externally engaging said second joint.

7. The tubular connection of claim 6 wherein said second joint contains an external annular ring, and wherein said first half segment and said second half segment each comprise an internal groove, so that said internal grooves of said first half segment and said second half segment of said sub engage with said external annular ring in order to prevent said first and second half segments from slipping.

* * * * *